(12) United States Patent
Dorney

(10) Patent No.: US 8,151,832 B1
(45) Date of Patent: *Apr. 10, 2012

(54) BEVERAGE DISPENSING SYSTEM

(75) Inventor: Peter Dorney, Winter Springs, FL (US)

(73) Assignee: Validfill LLC, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/910,599

(22) Filed: Oct. 22, 2010

Related U.S. Application Data

(63) Continuation of application No. 11/701,830, filed on Jan. 30, 2007, now Pat. No. 7,845,375, which is a continuation-in-part of application No. 10/971,486, filed on Oct. 22, 2004, now abandoned, and a continuation-in-part of application No. 10/922,470, filed on Aug. 20, 2004, now Pat. No. 7,617,850.

(60) Provisional application No. 60/513,662, filed on Oct. 23, 2003, provisional application No. 60/518,904, filed on Nov. 10, 2003.

(51) Int. Cl.
*B65B 1/30* (2006.01)
(52) U.S. Cl. .......................................... 141/94; 141/360
(58) Field of Classification Search .............. 141/9, 94, 141/104, 235, 237, 351, 360
See application file for complete search history.

(56) References Cited

U.S. PATENT DOCUMENTS

| | | | | |
|---|---|---|---|---|
| 3,568,887 A | * | 3/1971 | Jacobs et al. | 222/640 |
| 5,129,548 A | * | 7/1992 | Wisniewski | 222/16 |
| 5,566,732 A | | 10/1996 | Nelson | |
| 5,603,430 A | * | 2/1997 | Loehrke et al. | 222/1 |
| 6,354,468 B1 | | 3/2002 | Rick | |
| 6,564,999 B1 | * | 5/2003 | Saveliev et al. | 235/383 |
| 6,572,016 B2 | * | 6/2003 | Saveliev et al. | 235/383 |
| 6,759,072 B1 | * | 7/2004 | Gutwein et al. | 426/433 |
| 6,968,876 B2 | | 11/2005 | Yacko et al. | |
| 7,032,818 B2 | * | 4/2006 | Thomas et al. | 235/381 |
| 2002/0107742 A1 | | 8/2002 | Magill | |
| 2002/0123926 A1 | * | 9/2002 | Bushold et al. | 705/14 |
| 2002/0134831 A1 | * | 9/2002 | Saveliev et al. | 235/375 |
| 2003/0051767 A1 | * | 3/2003 | Coccaro et al. | 141/351 |
| 2003/0071806 A1 | * | 4/2003 | Annand | 345/418 |
| 2004/0000713 A1 | | 1/2004 | Yamashita et al. | |
| 2005/0035011 A1 | | 2/2005 | McRobbie | |
| 2005/0087255 A1 | | 4/2005 | Humphrey et al. | |
| 2005/0099304 A1 | | 5/2005 | Humphrey | |
| 2005/0154644 A1 | | 7/2005 | Deakin et al. | |
| 2005/0251287 A1 | | 11/2005 | Thornton et al. | |
| 2006/0106489 A1 | | 5/2006 | Zito, Jr. | |
| 2006/0108415 A1 | | 5/2006 | Thomas et al. | |
| 2006/0180647 A1 | | 8/2006 | Hansen | |
| 2008/0156395 A1 | | 7/2008 | Janardhanam et al. | |

\* cited by examiner

*Primary Examiner* — Gregory Huson
*Assistant Examiner* — Jason Niesz
(74) *Attorney, Agent, or Firm* — Buchanan Ingersoll & Rooney PC

(57) ABSTRACT

A beverage dispensing system comprising a dispensing device including a dispensing valve for dispensing a beverage, an actuator for initiating the dispensing of said beverage through said valve, a display screen having a user interface being coupled to said dispensing device, wireless communication electronics coupled to said beverage dispensing system and adapted to communicate with a wireless transponder and a controller functionally connected to said at least one dispensing valve, said display screen and said wireless communication electronics.

7 Claims, 6 Drawing Sheets

BEVERAGE DISPENSING SYSTEM

RELATED APPLICATIONS

This application is a continuation of U.S. patent application Ser. No. 11/701,830 filed Jan. 30, 2007 which is a continuation-in-part of U.S. patent application Ser. No. 10/922,470, filed Aug. 20, 2004 and U.S. patent application Ser. No. 10/971,486, filed Oct. 22, 2004 (now abandoned), which was a continuation-in-part of U.S. patent application Ser. No. 10/922,470, filed Aug. 20, 2004, and which claimed priority to U.S. Provisional Patent Application No. 60/513,662, filed Oct. 23, 2003 and U.S. Provisional Patent Application No. 60/518,904, filed Nov. 10, 2003. Each of the foregoing applications is hereby expressly incorporated by reference in its entirety.

DETAILED DESCRIPTION OF THE EMBODIMENTS

Figure 1:
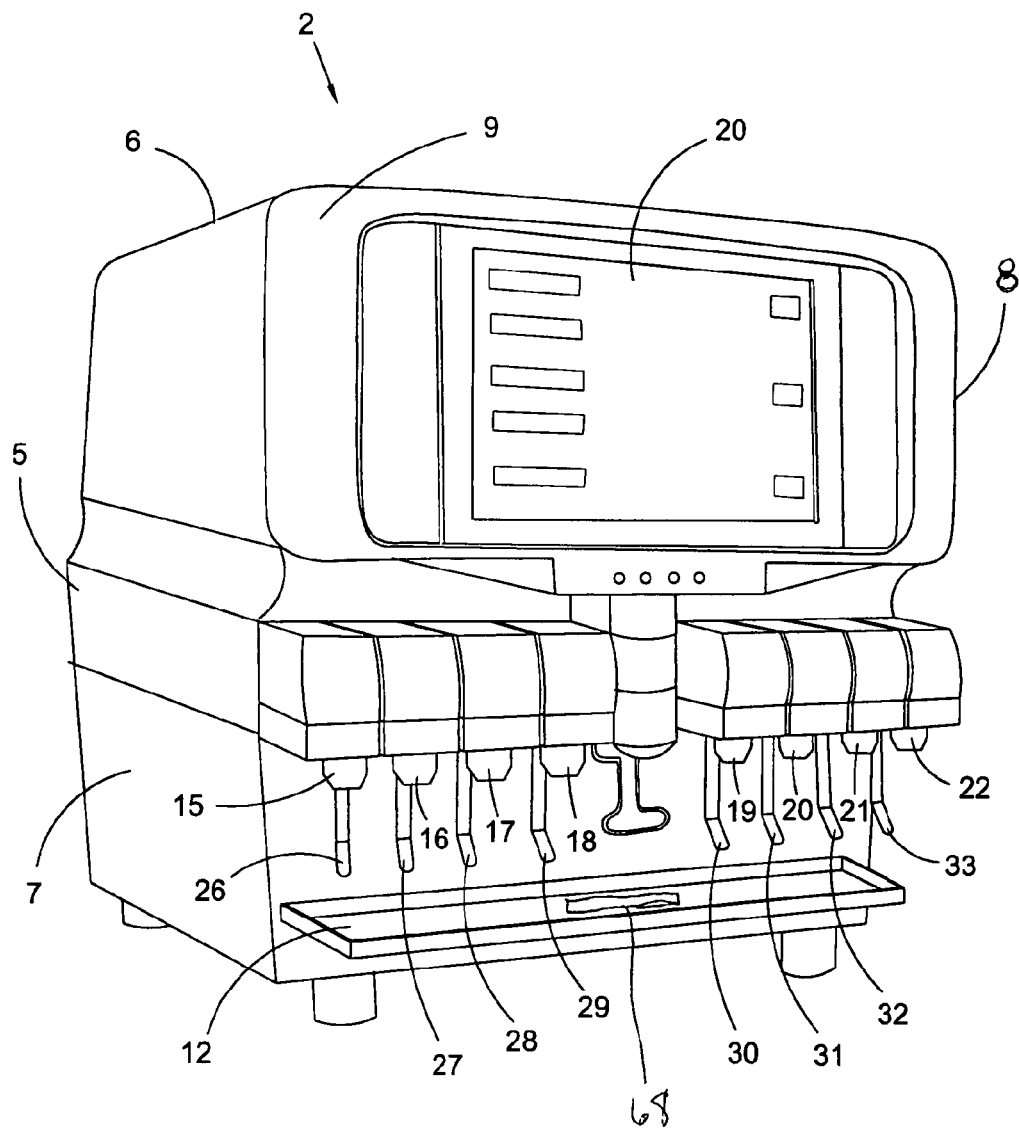
FIG. 1 illustrates a beverage dispensing system according to an embodiment of the invention.

FIG. 1 is an illustration of a beverage dispensing system 2 according to one embodiment of the invention. Beverage dispensing system 2 includes a dispenser housing 5 having a top surface 6, side panels 7 and 8, front face 9 and back surface (not shown). Also shown is a drip tray 12, valves 15-22, a display screen 20, and lever actuators 26-33. Valves 15-22 are controlled by corresponding dispensing head electronics (not shown). It should be understood that the basic components of the beverage dispensing system are not limited by this description. For example, display screen 20 may be positioned above housing 5 rather than within front face 9 of housing 5. Actuators may be levers (as shown), buttons, or any other type of actuator known in the art. The dispensing of beverage may alternatively be activated by sensing a cup below one of valves 15-22. Further, the shape and size of the housing may vary according to the needs of the establishment where beverage dispensing system 2 is to be located.

Figure 2:
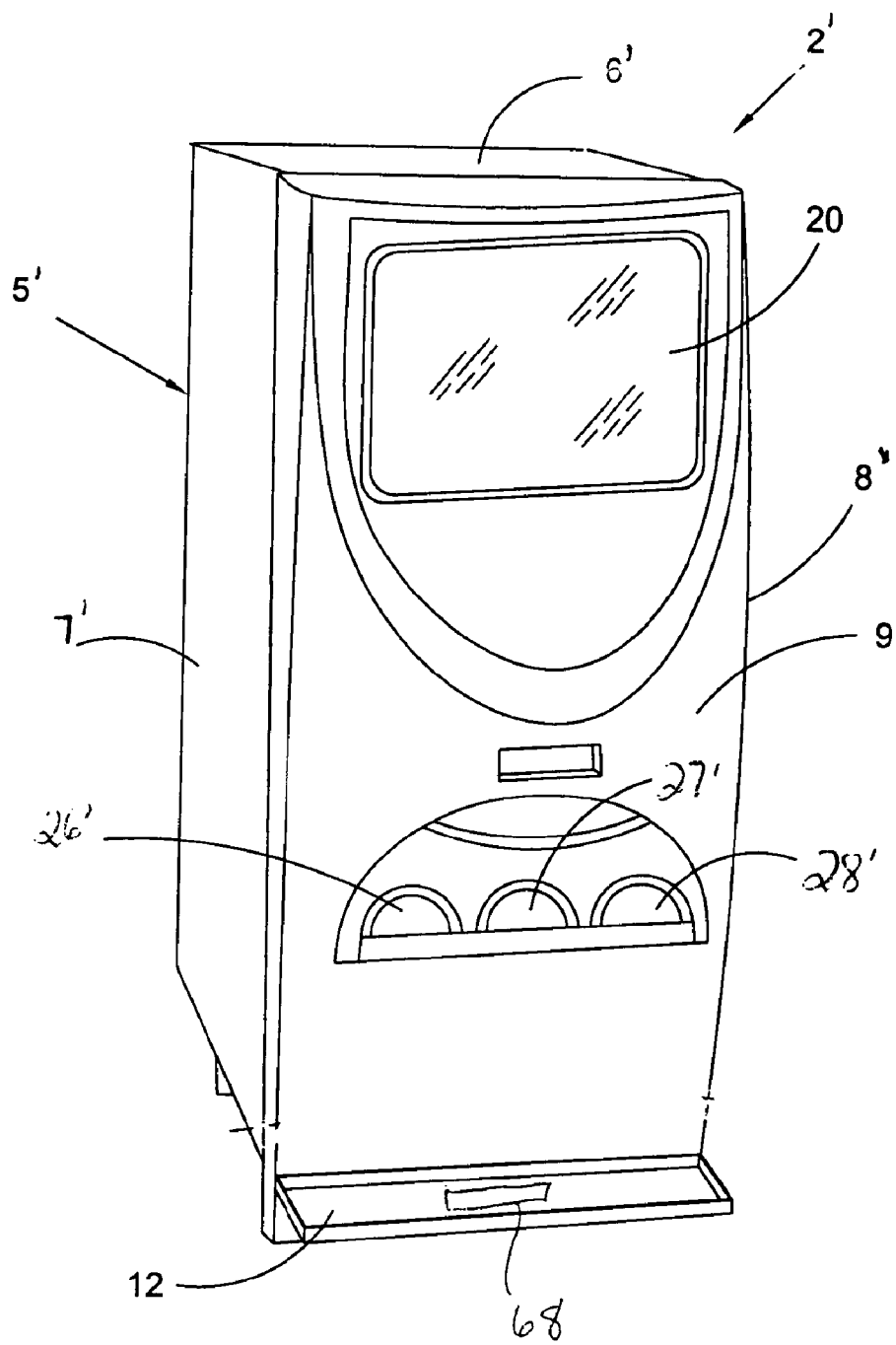
FIG. 2 illustrates an alternate embodiment of a beverage dispensing system.

With reference to FIG. 2, the beverage dispensing system may be a dispenser for coffee or other hot beverages. The hot beverage dispensing system is generally indicated at reference numeral 2'. Hot beverage dispensing system 2' is shown to include a housing 5' having a top surface 6', side panels 7' and 8', front face 9' and back surface (not shown). Also shown is a drip tray 12', actuators 26'-28', a display screen 20'. Although not shown, hot beverage is dispensed through valves positioned below actuators 26'-28'. The valves are controlled by corresponding dispensing head electronics (not shown). It should be understood that the basic components of the beverage dispensing system are not limited by this description. For example, display. screen 20' may be positioned above housing 5' rather than within front face 9' of housing 5'. Further, the shape and size of the housing may vary according to the needs of the establishment where beverage dispensing system 2' is to be located. The remaining description, unless otherwise indicated, will be presented with reference to cold beverage dispensing system 2; however, it should be realized that all of the disclosed features of the embodiments of the invention are equally applicable to hot beverage dispensing system 2'. It should also be recognized that the following disclosure is not limited to cold and hot beverage dispensers and is equally applicable to frozen beverage dispensers, Frozen Carbonated Beverage Machines or any other type of beverage dispenser.

Figure 3:
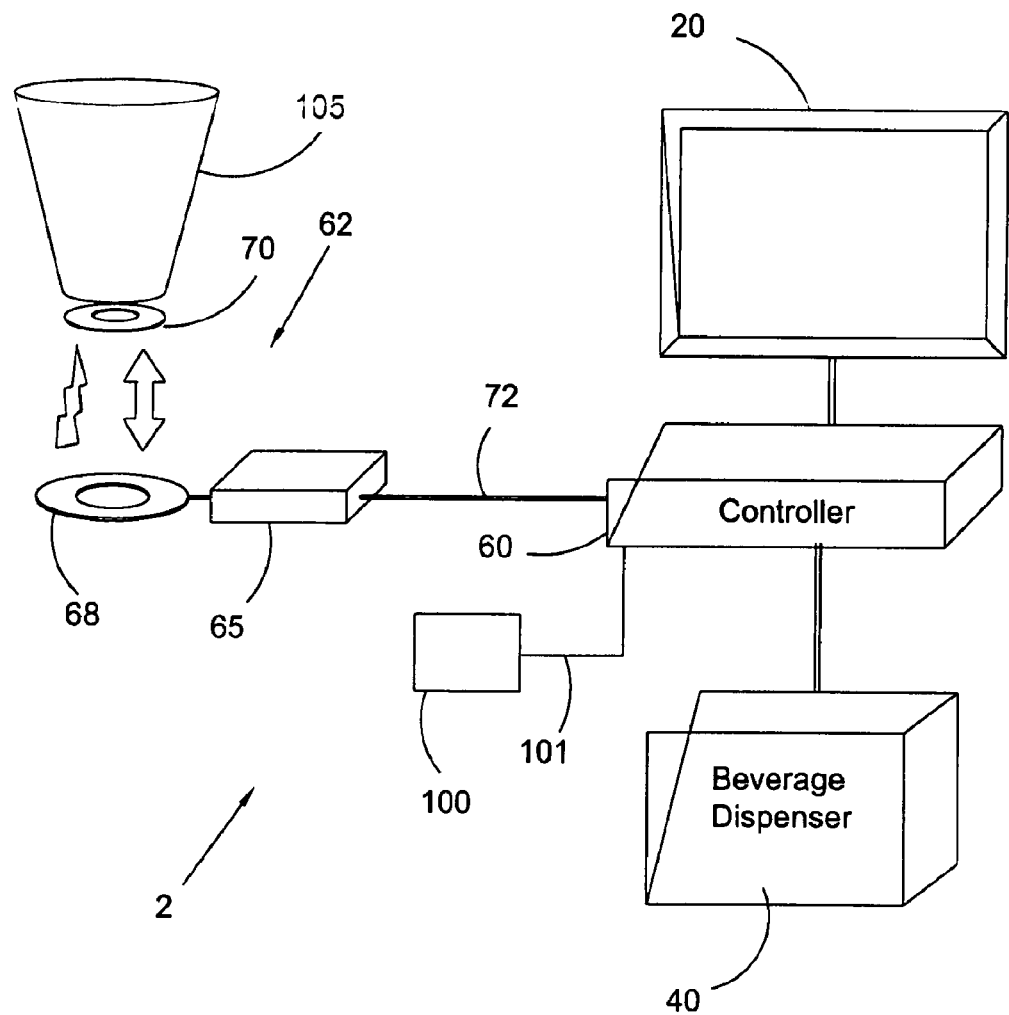
FIG. 3 is a schematic illustration of a beverage dispensing system according to an embodiment of the invention.

As shown in FIG. 3, Beverage Dispensing System 2 includes a dispenser 40, central processing unit (CPU) or controller 60 operatively coupled to actuators 26-33 (shown in FIG. 1), display screen 20 which functions as a user interface. Beverage dispensing system 2 also includes a relay (not shown) coupled to valves 15-22. Components that provide for remote communication with a customer are also provided. In the embodiment of FIG. 3, beverage dispensing system 2 is equipped with RFID hardware 62, which includes an RFID tag reader or interrogator 65 and an antenna 68. Antenna 68, which allows information to be sent between an RFID tag 70 and reader 65, can be any shape or size. For example, antenna 68 may be embedded with in drip tray 12, as shown in FIG. 1, or antenna 68 may span the entire width of drip tray 12 or protrude in front of drip tray 12. Reader 65 is the hardware that determines (using software code) what information is sent/received from CPU 60. Antenna 68, which includes a transceiver and decoder, may emit a signal for activating RFID tag 70 for reading and writing data. In addition, antenna 68 includes an antenna housing (not shown) which may be formed from plastic. Antenna 68 may be a high frequency (HF) or ultra high frequency (UHF) type antenna. The UHF antenna may be placed in drip tray 12. In addition, the antenna housing may include an indicator light that is green when an RFID tag is in communication with RFID hardware 62 and red when no tag is detected in the reading field. Reader 65 decodes the data encoded in an integrated circuit (silicon chip) of tag 70. The data is then passed on to controller 60, wherein application software processes the data. In one embodiment, beverage dispensing system 2 may include off the shelf ISO certified RFID readers, antennas, and chips to create a software driven system that can be manipulated to create self serve refill cup programs, track inventory of fountain beverage, ice, and cup inventory.

In one embodiment antenna 68 is located in a vertical plane in the proximity of beverage dispensing system 2 beneath valves 15-22. As discussed above, reader 65 and antenna 68 are operatively coupled with tag 70 for communicating with the tag 70. In addition, reader 65 is operatively coupled with controller 60 for communicating with controller 60. As shown in FIG. 3, reader 65 may send and receive information from controller 60 via USB cable 72 or serial port cable. In another embodiment, a second antenna (not shown) is provided. The second antenna may be positioned in a horizontal plane attached to drip tray 12 of beverage dispensing system 2 for gathering information and sending information back to RFID tag 70 to be stored. In an alternate embodiment two antennas may be positioned on drip tray 12 (horizontal plane) or two antennas may be positioned in a vertical plane.

Figure 4:
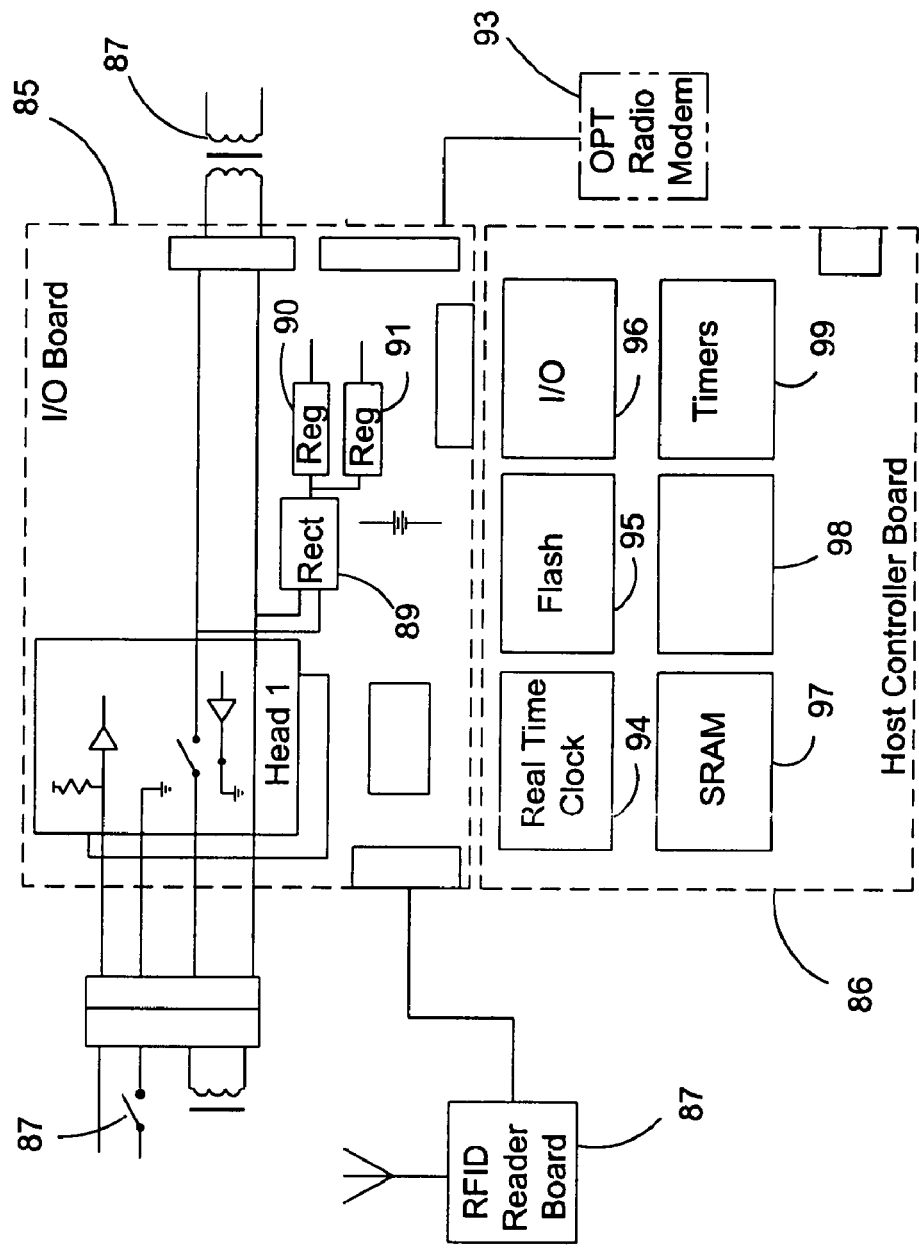
FIG. 4 is a block diagram of the circuitry employed in the dispensing systems of FIGS. 1 and 2.

FIG. 4 illustrates one embodiment of suitable RFID circuitry for beverage dispensing system 2. As shown, the circuitry includes an input/output (I/O) board 85 and a host controller board 86. I/O board 85 includes an off/on switch 87, a power providing transformer 88, a rectifier 89 and two regulators 90 and 91. Also included are an RFID reader board 92 and a modem 93, which may be an optical radio modem, inputting information to I/O board 85. Host controller board 86 may include a clock 94, which may be a real-time clock. Host controller board 86 may also include a flash 95, an I/O 96, a SRAM 97, a CPU 98 and timers 99. Host controller board 86 provides the overall operation and data storage at dispensing system 2. The information can be sent via cellular Ethernet (internet), manual collection at the system, or a portable USB port memory storage device. The information can then be downloaded into a main computer for predetermined calculations, as will be discussed in detail below.

In the embodiment shown in FIG. 1, beverage dispensing system 2 includes a display screen 20 for communicating messages to customers. Display screen 20 may be a LCD touch sensor screen. In one embodiment, screen 20 includes a touch sensor keypad through which a customer may enter a numeric code or the like. The code may be a four or five digit code. As will be discussed below, a code may be entered to confirm that a cup/beverage has been paid for or for entry of payment information. An RFID tag is not required when the code is used to pour a beverage. Alternatively, a keypad may be provided separate from display screen 20. Display screen 20 may be used to display advertisements, interactive tutorial videos, payment instructions, etc.

As shown in FIG. 3, a Debit/credit card reader 100 may be coupled to beverage dispensing system 2. Card reader 100 is adapted to be used with cards having a magnetic strip containing information. The card may be a credit card, debit card or other card containing customer information. For example, in one embodiment the card is a hotel room access card or key card. This enables hotel guests to purchase beverages at the beverage dispensing system and charge the cost to their hotel room bill. Card reader 100 is coupled to beverage dispensing system 2 via wires 101 or other suitable connection devices.

Figures 5A, 5B:
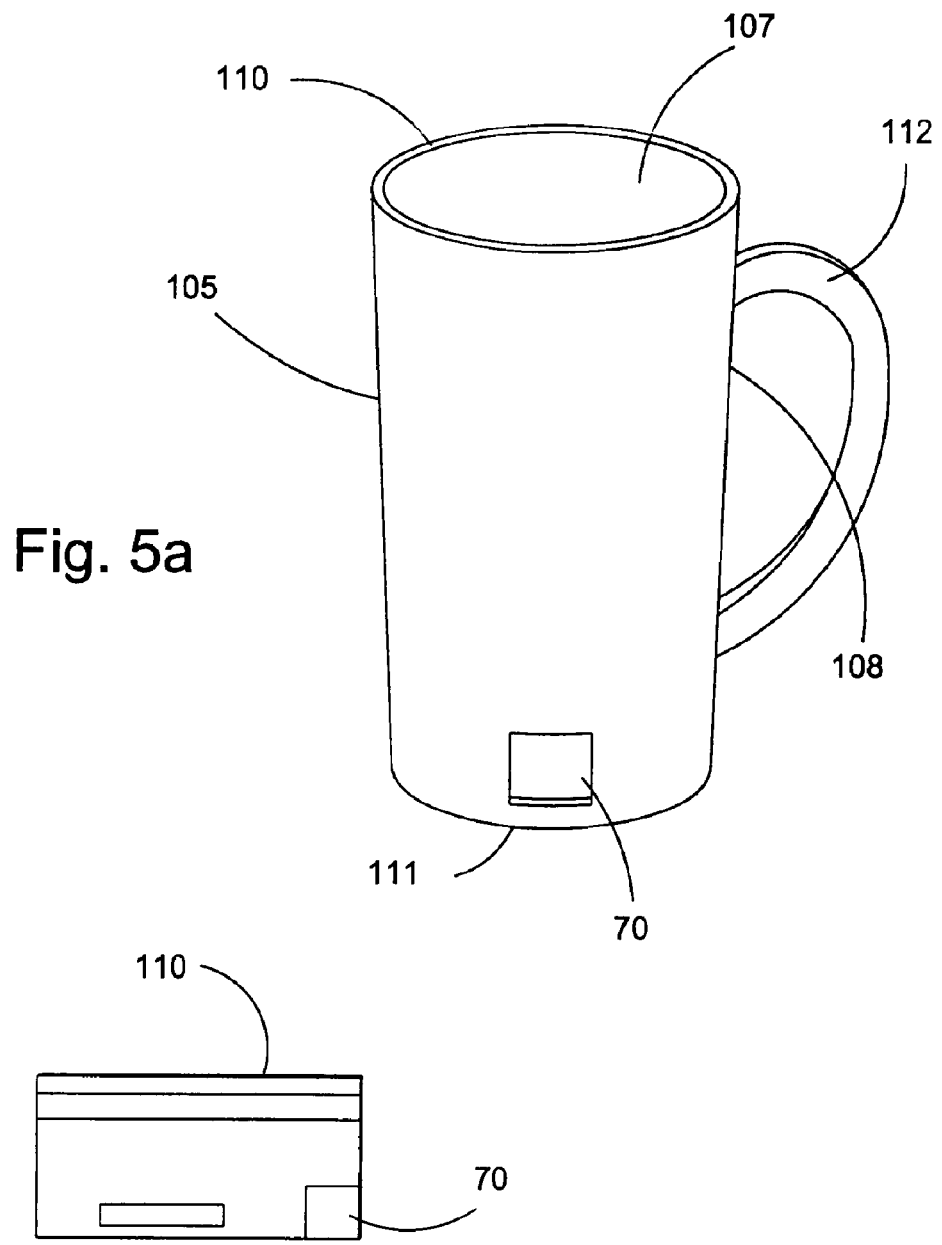
FIG. 5a is a transponder attached to a drinking container in accordance with an embodiment of the invention.
FIG. 5b is a transponder integrated into a card.

As discussed above, beverage dispensing system 2 is adapted to communicate with an RFID tag 70. As shown in FIG. 5a, RFID tag 70 may be attached to a container or cup 105. Cup 105 may have a generally cylindrical configuration with an inner wall 107 and an outer wall 108 defining an intermediate air space therebetween. Further, cup 105 may include an upper lip 110, a bottom 111, and a handle 112. RFID tag 70 may also be attached to any other type of container, such as a glass, paper, and bottle or, ice bucket as for ice. RFID tag 70 may be attached to the outer surface 108 of cup 105 by, e.g., an adhesive or fasteners or inlay molded into the plastic when the cup is manufactured. Those skilled in the art recognize that there are various techniques for coupling RFID tag 70 to cup 105. For example, although not illustrated, RFID tag 70 can be attached to the inner surface 107 of cup 105. Of course, a protective layer or housing can prevent contact between RFID tag 70 and the liquid held within cup 105. In one embodiment, RFID tag 70 can be embedded within cup 105. For example, RFID tag 70 can be embedded between inner wall 107 and outer wall 108. Cup 105 may be formed by molding around RFID tag 70. The molding process can be a one step or a multi-step process. For example, a first portion of cup 105 can be molded and then tag 70 can be attached to the first portion. An overlay or second portion can then be formed over both the first portion and tag 70. Of course, tag 70 can have various shapes and sizes. Tag 70 may have a thickness t1 less than then the thickness of t2 of the walls of cup 105. Those skilled in the art recognize that various techniques can be employed for embedding the RF receiver in cup 105. Cup 105 can also be a disposable cup. Those skilled in the art recognize that RFID tag 105 can be used in various other applications. For example, as illustrated in FIG. 5b, RFID tag 70 can be coupled to a card 110. Of course, RFID tag 70 could also be coupled to a lid or straw for a cup.

Tag 70 is adapted to store information relating to at least one of the purchase time, the purchase date, the size of the cup, and the amount of beverage being purchase. An ISO 15693 certified read/write 13.56 MHz RFID tag has the ability to read through water, human tissue and plastic. These ISO certified tags are individually numbered giving the system the ability to individually track each cup in the system. The tags also have anti-collision identification protocols within the ISO 15693 readers allowing multiple transponder or tags to be read simultaneously. In some embodiments, the tags will be passive tags, so the tags will not have a battery source, giving the tag a very long shelf-life. Passive RFID tag may be powered up by RFID antenna to read and write information to the tags. In one embodiment, tag 70 is powered up by a first antenna at a cash register and by a second RFID antenna at the dispensing system. Active tags, which use a battery source, may also be used in applications creating a larger read/write field.

Tag 70 as described in FIG. 5a includes 96 bits of storage. However, it should be understood that beverage dispensing system 2 may be used with either a high frequency (HF) or ultra-high frequency (UHF) antenna/reader. HF antennas/readers are less expensive, have smaller read fields and use more costly tags. UHF antennas/readers are more expensive, have larger read fields, and use lower cost tags. Tags may store information including: name, point of initial or last sale, initial or last location field (if the last location field is stored, the data of initial location field can be stored in the record of the transaction). Each tag may have a unique ID. For example, in one day, each location has approximately 520,000 unique IDs available. Tags may be manufactured with a pre-set unique Tag ID. In one embodiment, a software program will keep the last 6 digits of the unique pre-set ID. The probability that different cups will be assigned the same ID is minimized. However, if two cups happen to be assigned the same ID, other differences may be used to distinguish the tags (for example "Cup Volume", "No Of Units Bought", etc.) and create a unique combination. If a location is defined as, for example, an entire theme park the possibility of two tags having the same ID is more likely. If a location is highly specific, such as "Cash Register X, in store Y, at resort W, at theme park Z" this is much less likely happen. In one embodiment, location IDs are divided by regions. For example, there may be 2,000,000 IDs for each region (i.e. state or city).

In alternate embodiments, RFID tag 70 may be a read only tag, a WORM (write once, read many) tag, or a read/write tag. As is known in the art, read only RFID tags contain unique information that cannot be changed. WORM tags may be encoded a single time and then locked into a read only state. Read/write tags allow for unlimited updating and transfer of information to the tag. RFID tag 70 may take the form of a thin flexible label or ticket that may be affixed to an object, such as cup 105. Alternatively, as shown in FIG. 5b, tag 70 may be embedded in a card or integrated into an object. The tag 70 may also be molded directly into cup 105.

Tag 70 may also be an electronic article surveillance (EAS) tag. In general, the EAS tag would be attached to a disposable or non-disposable cup that will be filled at beverage dispensing system 2 only one time. Initially, the EAS tag will have a closed circuit/gate, rendering the tag active. When the EAS tag is placed over an EAS/RF antenna, the closed circuit is broken and the tag is deactivated. The EAS/RF antenna will indicate to controller 60 that an EAS tag has been deactivated and controller 60 will signal the dispensing heads to open until a predetermined number of ounces have been dispensed. The dispensing of a beverage occurs in a manner similar to that described below in connection with an RFID tag. Once the EAS tag's circuit is broken and the tag is deactivated, the tag cannot be reused. If a deactivated tag (broken circuit) is placed on the antenna again it will not send a signal to the dispensing machine to make the dispensing heads active, since the antenna only sends a signal to activate the dispensing heads after a EAS tag's circuit is broken. In one embodiment the EAS tag can be reactivated by purchasing a refill. However, each reactivation only allows for a single transaction since each reading of the EAS tag by the antenna effectively deactivates the tag.

It should be recognized that the embodiments described are not meant to be limiting and Tag 70 may include any read-only, read-write or a combination of read-only and read-write tags that are known in the art. For example Tag 70 could be any one of programmable identification tags, EEPROMs, smart cards, magnetic strip cards, resonance circuits, or optical cards. The beverage system 2 helps to control the theft of beverages dispensed into containers not associated with dispensing system 2, calculate the exact amount of ounces and the brand being poured into each cup (e.g., based volumetric flow rate and time) to allow the customer to determine the average ounces poured per cup per program (e.g., for price validation), manage inventory, and determine where the cups were purchased. These and other features will help retailers bill offsite locations for beverages poured at their locations. For example, a first retailer may receive money for the sale of an RFID mug and associated refills, but the customer goes to a second retailer to dispense the refill. Beverage dispensing system 2 allows the second retailer to bill the first retailer for the expense of the refill.

In one embodiment, a cash register includes RFID hardware capable of reading and writing information to and from RFID tag 70. RFID hardware at cash register may send information (location, promotion code, date, etc.) to RFID tag 70. After cup 105 with RFID tag 70 is purchased, the consumer may take cup 105 to dispensing system 2 to dispense a beverage. In one embodiment, antenna 68 is constantly looking for an RFID tag in the reading field. As discussed above, a single antenna (read station) that spans across one or more than one dispensing heads is used. The antenna can be placed in any suitable location, e.g., on the back panel above the drip pan and in front of the drip pan, or in the drip tray. Alternatively, multiple antennas may be used. Once the antenna finds a valid RFID tag it will open all of the heads so a beverage can be dispensed. Once a particular head is activated to dispense a beverage, the other heads will shut down.

Alternatively, the controller may notify the antenna to search into the reading field to validate a cup only after a lever or push button (on/off switch) is depressed in an attempt to dispense a beverage. In another embodiment, antenna 68 will not read into the reading field to validate a cup until after an infrared proximity sensor(s) sees that a cup is under the dispensing head. The sensor will then notify the dispensing machine to read the field for information. In one embodiment, a cup is time stamped by the host controller board/PCB as it enters the reading field. If multiple cups enter the field, each cup will be time stamped and read for information individually. The first cup that touches a lever has the flow button pushed or is read by the infrared proximity sensor will be "classified" as the first cup into the reading field, and will be matched up with the information received from the cup (RFID tag) that was time stamped first.

If a consumer attempts to dispense multiple beverages into the same cup during a singe transaction the total ounces of a beverage being poured into each cup is determined using time and flow rate based calculations. As described above, a cup may be time stamped when it enters the reading field or the RFID antenna may be instructed to search for an RFID tag after a cup is sensed by an IR sensor or when a button or lever is depressed. Each of these techniques assists dispensing machine 2 in identifying where cup 105 is located in the reading field. Therefore, time and flow rate based calculations may be performed. Reader 65 and antenna 68 have the ability to locate a tag within approximately a 1 foot grid. However, readers 65 and antennas 68 having a read field as small as inches from antenna 68 may be used.

Antenna 68 and reader 65 may be retroactively attached to beverage dispensing system 2. For example, antenna can be plugged into a harness that connects to controller 60. Controller 60 includes another harness that has a relay switch for each dispensing head. This relay switch (harness) is coupled to each dispensing head. The switch will be always or at least most of the time so that the head will be inactive and inoperable until the gate is closed. The harness that goes to the dispensing heads may also be used, if infrared proximity sensors are not being used, to notify the dispensing system that a cup is under a certain head. If an infrared proximity sensor is used to determine if a cup is under a dispensing head, a separate harness will be used. The harness will go from the host controller board/PCB to the infrared proximity sensors located on the antenna or dispensing machine.

In one embodiment, a refillable cup having an RFID tag is purchased at a cash register or other transaction area. At the time of purchase information is written to the RFID tag using the write antenna/reader at the register. For example, a customer may purchase a refillable cup and 5 refills of 16 ounces each. The number of refills and ounces per refill is written onto the RFID tag when the cup is purchased. When the customer approaches the beverage dispensing system 2, cup is placed under the dispensing head and the position of the cup is located, e.g., by an infrared proximity sensor, a lever, or an on/off push button on the dispensing head. When a cup is located, read antenna 72 will read the information on the cup's RFID tag. RFID tag may be prompted by CPU to search for tag 70 or antenna 68 may be constantly searching for an RFID tag. The collected information is used to verify the cups validity. If the cup is valid, a signal is sent from CPU 60 to a dispensing head. The signal may be sent through a harness having a relay switch that is coupled to the dispensing head. The valid signal will close the relay switch gate allowing the beverage to pour. Alternatively, the power to each head is turned on and off. When the power is on the dispensing head will pour, when the power is off the dispensing head will not pour. The head will stop pouring after the cup is moved away from the proximity sensor, the pour lever is released, the on/off push button is released, or the allotted ounce capacity for the cup has been reached.

Figure 6:
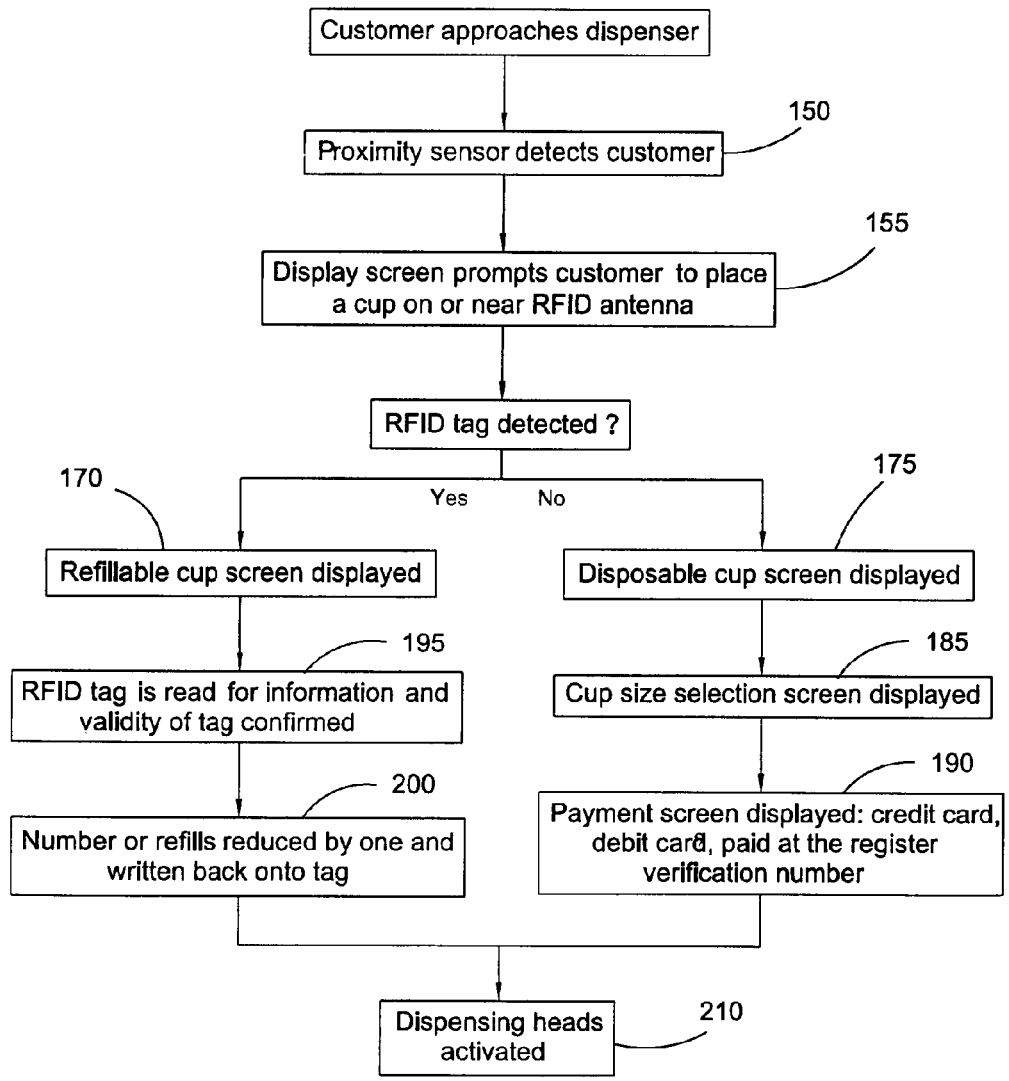
FIG. 6 is a flow chart representing a customer's interaction with beverage dispensing system.

FIG. 6 illustrates one embodiment of the basic flow of a customer's interaction with beverage dispensing system 2. As indicated in block 150, when a customer approaches system 2 a proximity sensor identifies that a person or object has entered the vicinity of system 2. For example, the proximity sensor may detect a person or object approximately 2 feet away from the sensor. In one embodiment the proximity sensor is located in the center of the drip tray, such as on the RFID antenna housing, which may be manufactured in plastic, in a horizontal configuration. A signal is then sent from the second proximity sensor to CPU 60 which activates display screen 20, as indicated in block 155. Display screen 20 will show an image of a customer placing a cup on or near RFID antenna 68. The Read/write RFID antenna 68 may include a second proximity sensor, in a vertical configuration, so when a cup is placed on the RFID antenna housing the proximity sensor will read that a cup is in the read/write antenna location. At this point, RF reader 73 will search, either automatically or by command from CPU 60, for an RFID tag 70. If an RFID tag is detected by reader 73, CPU 60 will signal user interface 19 to display a refillable cup screen, as indicated in block 170. If an RFID tag is not identified, the touch sensor screen will display a disposable cup screen, as indicated in block 175. The disposable and the refillable screens will show pictures of the cups that are available for refill promotions or disposable cups, respectively, as shown by block 185. The customer will select and touch a picture of the cup they want to purchase on the touch sensor screen. After the customer has selected the ounce size cup they want to purchase, the screen will go to the payment display screen with the following payment options: Debit card, Credit card, or Paid at the Register verification (see block 190). The customer may then select the desired payment option from the screen display.

If the customer selects the debit card or credit card options, the screen will prompt the following, or similar, questions: How many cups do you want to purchase ?; How many refills do you want to purchase ? The customer will select an appropriate response, for example, using a keypad on the screen, images on the screen or by a separate keypad. After these questions are answered the screen will display an image or video of a customer swiping a debit or credit card. The CPU will then prompt the screen to display a request of a customer's pin number or zip code and amount verification, before the transaction is processed. The transaction will then be processed as a normal debit or credit card purchase through a standard phone line or internet. Display screen 20 may also show commercials or other audiovisual presentations when the dispensing of a beverage begins.

If the customer has prepaid at the cash register, a verification code would have been printed at the time of purchase. The code will be generated through the use of the internal calendar and clock. Therefore, the code represents the time the cup is purchased. When prompted by the screen, the customer would select the "Paid at Register" option. A new screen display will then ask the customer to enter the verification code, which may be a 4-digit numerical code. CPU 60, by way of controller software, converts the code back into time of purchase data. If the time of purchase is within a predetermined time, such as 1 hour from the time of purchase, dispensing is allowed. The code also conveys information relating to the size of the cup.

Following payment by a credit/debit card or validation of the code, the dispensing heads will be activated as the dispensing heads are activated as indicated by block 210 of FIG. 6. At this time, the screen will instruct the customer to start pouring his/her beverage. This can be accomplished with a tutorial video or text display.

If a confirmed pre-paid RFID Tag was identified at the antenna, as described above, the CPU will prompt the RFID tag reader to read the RFID tag for information as indicated by block 195. For example, the Cup/RFID tag ISO number or custom number is read from the tag. This allows retailers to use the individual ID number to track inventory of the cups and determine how many ounces have been poured into each ISO numbered or custom numbered cup. The reader may also read information relating to the location where the cup and RFID tag were purchased. In addition, the number of remaining refills or time left on the RFID tag (in the case where the tag is valid for a predetermined time period, e.g. one day). This information is used by the CPU to determine if the tag is valid. The validity of the RFID tag will vary with each promotion and may be based on a calendar date or the number of refills. For example, the tag may include a calendar date/time at which it will be invalidated or a counter for determining when the maximum number of refills has been reached. The tag may also include information specific to the cup size, such as the designated pouring ounces to reach the capacity of the cup.

Following the reading of the information on the tag and verification of the validity of the tag, the CPU will reduce the number of pre-paid refills available on the RFID tag, assuming such information is stored on the tag. More specifically, RFID reader will read the number of refills available and send a signal to the CPU. The CPU will then reduce that number by one refill. The new counter number will then be written back onto the RFID tag, making the new number 1 less than the number that was originally read, as indicated by block 200. Information is written back the tag and confirmed before the beverage is poured into the cup in order to avoid inconsistent writing and confirming to the tag. Ice/liquid being poured into the cup may manipulate the RF field. The new counter number will be stored on the cups RFID tag and possibly the CPU. The information stored on the CPU may be used by the retailer to more accurately calculate inventory projections. In another embodiment, such as with HF tags, the HF tag is read and written to when it is placed on the antenna in one step. The read/write field of the HF tag is approximately 2 inches; therefore, the tag must remain with in the two inch field until information is written to the tag. Following the writing of the tag, a 30 second time window will begin to allow the customer to dispense the beverage. Following the writing of information back to tag 70 and the initiation of dispensing, the dispensing heads are activated as indicated by block 210 of FIG. 6.

In one embodiment, a read-only antenna is used in connection with dispensing system 2. The read-only antenna reads the tag's ISO number and sends the number or other relevant information to a central computer system via internet or a phone line. The central computer system validates the information on the cup, subtracting the refill counter number by 1, and sending validation information back to dispensing system 2. The computer system is capable of storing numerous counter numbers and processing transactions from multiple locations, in many different states, at the same time.

After the counter number is written to the RFID tag on the cup or the transaction is otherwise validated, the CPU will activate each dispensing head by supplying electrical power or the like. Therefore, all of the dispensing heads are active until a particular activator (lever, button, etc.) is engaged. Following the engagement of an activator, the remaining dispensing heads will be turned "off". The CPU will then begin counting the ounces being dispensed. The number of ounces may be determined by counting the seconds the beverage is being dispensed. For example, a typical cold fountain machine dispenses 3.5 ounces per second and a typical hot/coffee dispensing machine dispenses 1.8 ounces per second. Therefore, if a cold fountain machine refill is 16 ounces the CPU will begin counting the seconds and shut off the dispensing head after approximately 4.5 second.

CPU will continue to count the ounces dispensed until the designated maximum capacity (beverage and ice) of the cup has been poured; therefore, a customer will have the ability to switch the type of beverage being dispensed before the maximum amount has been dispensed. If the actuator is disengaged, such as a cup being pulled away from a lever actuator, the dispensing of the beverage will stop. The CPU will then open all of the dispensing heads until another actuator is engaged. The remaining heads will then be deactivated once again. However, if an actuator is not engaged within a predetermined number of seconds, the CPU will stop the transaction and close the dispensing heads. In addition, if the proximity sensor no longer detects a person or object within the vicinity of the dispensing system, indicating that the customer has left the area, the CPU will close the dispensing heads. For example, if a person or object is not detected for ten (10) seconds the heads will shut down. The predetermined time limit for sensing a person may be shorter than the time limit for not engaging an actuator. Therefore, if a person leaves the area the heads will shut down without much delay, but if a customer is in front of the machine making a decision the machine will allow for a longer delay.

Beverage dispensing system 2 allows for one or more users to dispense beverages simultaneously. However, if more than one actuator per validated code/RFID tag is engaged, all dispensing heads will be deactivated. Dispensing will resume when the correct number of actuators are engaged. The dispensing system may have a maximum user limit, such as two users at a time. For example, when a first customer enters the vicinity of beverage dispenser 2 (in the case of an antenna that automatically reads) or is placed on antenna (in the case where antenna is prompted to read as a result of a proximity sensor) that customer's RFID tag is read and the ISO number on the tag is registered by beverage dispensing system 2 as user 1. Beverage dispensing system 2 assumes that the first actuator to be engaged is engaged by user 1. In the case where the antenna automatically searches for an RFID tag, the antenna reads every 1/10 of a second; therefore, the sequence of users will be very accurate. When a second user enters the antenna's read field, the ISO number on the tag will be read and stored as user 2. The second actuator that is engaged will be assumed to be user 2. If one of the users disengages the actuator, CPU 60 it will know which user was using that designated dispensing head. The next actuator that is engaged will be assumed to be engaged by the user that pulled away from the previous dispensing head. As described above, CPU calculates the number of ounces poured into each cup; therefore, if the ounce capacity is not reached, the user will be able to continue pouring the same brand or a different brand until the ounce capacity is met.

In an alternate embodiment, half of the dispensing heads remain activated when a valid RFID tag is detected and an actuator is engaged. For example, if a first tag is validated, all of the dispensing heads are opened. When a customer (with the first tag) engages an actuator, half of the dispensing heads are closed. With reference to FIG. 1, if actuator 26 is engaged, dispensing heads associated with valves 15-18 will remain open and dispensing heads associated with valves 19-23 will close. If a second tag is validated while the first customer is dispensing a beverage, the remaining dispensing heads 19-23 will be activated. In another embodiment, all dispensing heads will open when a first tag is validated. The heads will close after a lever is pushed. All of the heads will reopen if a second tag is validated. They will then close after a second lever is pushed.

After the transaction is complete additional information may be written onto tag 74. This information may include the type of beverage poured, ounces poured, and time of pour. The information is stored under each individual ISO number in the CPU and may be sent to a centralized computer through the use of the internet, phone lines, USB port/memory stick, or an Active RFID chip. This transfer of information may occur at a predetermined time and/or day. The centralized computer will collect and compile the data and manipulate it into useful data, such as the average ounces poured into refillable and disposable cups. The centralized computer is also capable of calculating or determining the true costs between refillable and disposable cups, ounces poured into each cup, the true cost per customer, the brand poured into each cup (i.e. ounces of each brand). This information is useful for tracking the inventory of each brand. Therefore, the manager can be notified and/or inventory can be automatically ordered using an inventory system. The centralized computer system may also identify and report the locations where the RFID tagged cups were refilled, thus allowing retailers to cross-bill to recover their true costs and profits.

The system may be completely software driven so that promotions are endless. For example, to increase more frequent visits at a store with a cup refill program you have to create loyalty. A way to achieve this is to give cups (and their owners) reward points for using their cups at the store chain. The more times people pour at a certain store chain, the more reward points they receive. Another example is that a customer can be given 5 free ups for every 10 purchased. The customer does not have to worry about a ticket, and the store can actually see true numbers for the number of pours a person actually pours for this type of promotion.

RFID tag, which is coupled to cup 105 and in communication with a cash register system (not shown) and/or beverage dispenser 40. The register system 306 and dispenser 40 are in communication with controller 60. The register system includes a transmitter that communicates with a register. The register could include an integrated transmitter. Alternatively, the system could use a separate transmitter which does not communicate with the register and, for example, includes a separate input device, such as a touch pad. In one embodiment, the register is a cash register that is used to determine the cost of the customer's order. The transmitter can be in communication with the register so that data is exchanged between RFID tag 70 and register when the customer buys a drink and receives the cup 105.

The CPU 60 can be in communication with the register system and beverage dispenser 40. The register system and beverage dispenser 40 have transmitters, and are in communication with controller 60. For example, controller 60 can receive signals from the transmitter and then can communicate with the beverage dispenser 40 to cause the dispenser 40 to dispense or not dispense liquid when one of actuators 26-33 is moved. In one embodiment, when the customer buys a drink, the register sends a signal based on data from the transmitter. Controller 60 can communicate with the transmitter to control the liquid dispensed by dispenser 40. Alternatively, controller 60 can let the restaurant know, for example, through a signal to the register system and/or a display, that someone is seeking an unauthorized refill. Preferably, the transmitter is proximate to dispenser 40 to ensure proper communication between the transmitter and RFID tag 70. Although not illustrated, controller 60 can be at various locations on the vendor' premises. For example, controller 60 can be within housing 5 of the dispenser 40 or underneath a counter, preferably not accessible to the public. Of course, the vendor can be a drink seller, such as a fast food restaurant, food court, a concession stand (e.g., at an amusement park), cafeteria, or the like.

In one embodiment, beverage dispensing system 2 is coupled to a food preparation area such that a customer can order food items without the need to approach a traditional cash register. Screen 20 may include a "Menu" selection option. This will allow a customer to select menu items for purchase at dispensing system 2 by making a sequence of choices, which will be prompted by screen 20. Once the desired menu items have been selected, the customer may pay for the items using debit/credit card apparatus #, which is coupled to dispensing system 2. Following the selection and payment of menu items, the order is sent to monitors in a food preparation area (not shown) by wires or other suitable communication means, such as internet or cellular technology. The monitors in the food preparation area will display the order made at beverage dispensing system 2 so that the appropriate personnel can promptly prepare the order. Software for controlling the menu functions of the beverage dispensing system 2 may be coupled to a central cash register within a store via wires or other suitable means. A record of the transaction can be sent to the central cash register for record keeping and inventory purposes.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. While particular forms of the invention have been described, it will be apparent that various modifications can be made without departing from the spirit and scope of the invention. Accordingly, it is not intended that the invention be limited, except as by the appended claims.

The invention claimed is:

1. A method for dispensing at least one of ice and a beverage from a beverage dispensing system including a dispensing device with at least one dispensing valve for dispensing at least one of ice and a beverage, an actuator for initiating the dispensing of said beverage through said valve, a display screen, wireless communication electronics and a controller, said method comprising:
   detecting the presence of a beverage container within a predetermined area of said dispensing device;
   searching for a RFID tag within a read field;
      displaying an exhibit on said display screen, said exhibit being a first screen if an RFID tag was detected and a second screen if an RFID tag was not detected in said read field;
      verifying validity of said RFID tag or payment information and determining a verified amount of at least one of ice and a beverage to dispense;
      modifying information read from said RFID tag and writing said modified information back onto said tag, wherein the step of modifying information includes recording the type and amount of beverage dispensed;
      opening said valve to allow dispensing of said at least one of ice and a beverage when said actuator is engaged; and
      closing said valve following the dispensing of the verified amount of said at least one of ice and a beverage.

2. A beverage dispensing system comprising:
   a dispensing device including at least one dispensing valve for dispensing at least one of ice and a beverage;
   an actuator for initiating the dispensing of said at least one of ice and a beverage through said at least one dispensing valve;
   a display screen;
   wireless communication electronics coupled to said dispensing device and adapted to detect and to communicate with a wireless transponder;
   a controller functionally connected to said at least one dispensing valve, said display screen and said wireless communication electronics;
   wherein, when said transponder is detected by the wireless communication electronics, the controller activates the actuator and initiates dispensing of said at least one of ice and a beverage, wherein said controller modifies information read from said transponder and writes said modified information back onto said transponder, wherein the modified information includes recording a type and amount of beverage dispensed.

3. The beverage dispensing system of claim 2, wherein said transponder is part of a member of the group consisting of a beverage container and a card.

4. A method for dispensing at least one of ice and a beverage from a beverage dispensing system including a dispensing device with at least one dispensing valve for dispensing at least one of ice and a beverage, an actuator for initiating the dispensing of said at least one of ice and a beverage through said valve, a display screen, wireless communication electronics and a controller, said method comprising:
   detecting the presence of a beverage container by depression of a lever;
   searching for a RFID tag containing information within a read field;
   displaying an exhibit on said display screen, said exhibit being determined based on the information on said RFID tag;
   verifying validity of said RFID tag or payment information and determining a verified amount of at least one of ice and a beverage to dispense;
   modifying the information read from the RFID tag and writing said modified information back onto said RFID tag, wherein the modified information includes recording a type and amount of beverage dispensed,
   opening said valve to allow dispensing of said at least one of ice and a beverage when said actuator is engaged;
   closing said valve following the dispensing of the verified amount of said at least one of ice and a beverage.

5. The method of claim 4, wherein said transponder is part of a member of the group consisting of a beverage container and a card.

6. A beverage dispensing system comprising:
   a dispensing device including at least one dispensing valve for dispensing at least one of ice and a beverage;
   an actuator for initiating the dispensing of said at least one of ice and a beverage through said valve;
   wireless communication electronics coupled to said dispensing device and adapted to communicate with a wireless transponder;
   a controller functionally connected to said at least one dispensing valve, to a display screen and to said wireless communication electronics;
   said controller activating said display screen in response to a signal from the transponder and displaying a first exhibit if a wireless transponder is detected by said wireless communication electronics and displaying a second exhibit if a wireless transponder is not detected by said wireless communication electronics, wherein said controller modifies information read from the transponder and writes said modified information back onto said transponder, wherein the modified information includes recording a type and amount of beverage dispensed.

7. The beverage dispensing system of claim 6, wherein said transponder is part of a member of the group consisting of a beverage container and a card.

* * * * *